United States Patent
Lisseman et al.

(10) Patent No.: US 8,540,281 B2
(45) Date of Patent: Sep. 24, 2013

(54) STEERING SYSTEM

(75) Inventors: Jason Carl Lisseman, Shelby Township, MI (US); Steve Pasteiner, Auburn Hills, MI (US); Jerome Bosch, Romeo, MI (US); Valerie Gardner, St. Clair Township, MI (US)

(73) Assignee: TK Holdings Inc., Auburn Hills, MI (US)

( * ) Notice: Subject to any disclaimer, the term of this patent is extended or adjusted under 35 U.S.C. 154(b) by 81 days.

(21) Appl. No.: 13/102,988

(22) Filed: May 6, 2011

(65) Prior Publication Data

US 2011/0272930 A1 Nov. 10, 2011

Related U.S. Application Data

(60) Provisional application No. 61/332,476, filed on May 7, 2010.

(51) Int. Cl.
*B62D 1/14* (2006.01)

(52) U.S. Cl.
USPC .............................. 280/778; 180/332; 74/492

(58) Field of Classification Search
USPC ............ 280/778, 731; 180/332, 425; 74/492
See application file for complete search history.

(56) References Cited

U.S. PATENT DOCUMENTS

| | | | | |
|---|---|---|---|---|
| 2,699,203 A * | 1/1955 | White | | 297/411.23 |
| 3,196,709 A * | 7/1965 | Bickford | | 74/557 |
| 3,256,749 A * | 6/1966 | Grohsbach | | 74/497 |
| 3,282,124 A * | 11/1966 | Peterson | | 74/494 |
| 3,312,123 A * | 4/1967 | Rumpf | | 74/494 |
| 5,007,301 A * | 4/1991 | Powell | | 74/557 |
| 5,755,142 A * | 5/1998 | Jacoby | | 74/552 |
| 6,224,093 B1 * | 5/2001 | Ochiai et al. | | 280/731 |
| 6,705,419 B2 * | 3/2004 | Menjak et al. | | 180/402 |
| 6,938,720 B2 * | 9/2005 | Menjak et al. | | 180/402 |
| 7,017,704 B2 * | 3/2006 | Kapaan et al. | | 180/315 |
| 7,147,080 B2 * | 12/2006 | Higashi et al. | | 180/315 |
| 7,441,799 B2 * | 10/2008 | Enders et al. | | 280/731 |
| 7,726,692 B2 * | 6/2010 | Ozaki et al. | | 280/778 |
| 7,806,224 B2 * | 10/2010 | Maeda et al. | | 180/334 |
| 7,862,084 B2 * | 1/2011 | Maeda et al. | | 280/775 |
| 2003/0226708 A1 * | 12/2003 | Hancock et al. | | 180/332 |
| 2007/0084658 A1 * | 4/2007 | Yamazaki et al. | | 180/219 |
| 2007/0096449 A1 * | 5/2007 | Okada et al. | | 280/775 |
| 2009/0007714 A1 * | 1/2009 | Carlini | | 74/492 |
| 2009/0050397 A1 * | 2/2009 | Onuma | | 180/402 |

\* cited by examiner

*Primary Examiner* — Drew Brown
*Assistant Examiner* — Timothy Wilhelm
(74) *Attorney, Agent, or Firm* — Foley & Lardner LLP

(57) ABSTRACT

A steering system for allowing an operator to control the direction of travel of a vehicle propelled on wheels. The steering system comprises a steering input device configured to include a handle pivotally coupled to a linkage assembly configured to swivel, wherein the handle is configured to move in the fore and aft direction, wherein the steering input device generates input data based on the position of the linkage assembly and/or the handle. The steering system further comprises a communication device to communicate the input data received by the steering input device to a lower steering system, wherein the lower steering system is configured to receive the input data from the steering input device and control the direction of the wheels based on the input data received.

18 Claims, 6 Drawing Sheets

STEERING SYSTEM

CROSS-REFERENCE TO RELATED PATENT APPLICATIONS

This application claims priority to and the benefit of U.S. Provisional Patent Application No. 61/332,476, filed on May 7, 2010, which is incorporated herein by reference in its entirety.

BACKGROUND

The present application relates generally to the field of steering systems for use in vehicles. More specifically, the present application relates to an improved steering system that includes a steering input device having a smaller packaging size and more ergonomic mode of operation, while providing a reduced likelihood of injury to the operator of the steering input device, such as during a vehicle impact.

As the automotive market moves towards increased use of smaller "micro" city vehicles (e.g., city cars, microcars, etc.), alternative control concepts are being considered.

Conventional steering wheels can intrude into the occupant space, especially in a smaller vehicle. Further, conventional steering wheels require the use of coiled "clock spring" wires to conductively couple switches on the rotating steering wheel to the stationary steering column.

One potential alternative is the use of a handlebar system similar to those used for motorbikes and ATVs. However, conventional handlebar systems have several shortcomings. A handlebar must be rotated about a central pivot, causing the handles to rotate and become twisted relative to the driver. For example, as the vehicle is steered to the right, the right hand side handle of the handlebar is rotated toward the driver. The rotation of the handlebar causes the right wrist of the driver to be twisted and places the handlebar into the frontal protection zone (e.g., the space occupied by a driver's frontal airbag cushion in a vehicle collision). The intrusion of the handlebar into the frontal protection zone both introduces a potentially dangerous situation in which the driver is more likely to impact the handlebar, such as during a vehicle impact, and may interfere with the proper deployment of an airbag cushion. Further, the left hand side of the handlebar is simultaneously rotated away from the driver, causing the driver to have to stretch in an uncomfortable manner to maintain contact with the left hand side of the handlebar. The stretching motion may also cause the driver to have to lean away from the seat back, especially for a smaller driver. Leaning forward, away from the seat back when the vehicle is in motion can increase the likelihood of injury in a collision.

It would be desirable to provide an improved steering system for a vehicle, such as city cars and microcars.

SUMMARY

One embodiment relates to a steering system for allowing an operator to control the direction of travel of a vehicle propelled on wheels. The steering system comprises a steering input device configured to include a handle pivotally coupled to a linkage assembly configured to swivel, wherein the handle is configured to move in the fore and aft direction, wherein the steering input device generates input data based on the position of the linkage assembly and/or the handle. The steering system further comprising a communication device to communicate the input data received by the steering input device to a lower steering system, wherein the lower steering system is configured to receive the input data from the steering input device and control the direction of the wheels based on the input data received.

Another embodiment relates to a steering input device for allowing an operator of a vehicle to control the vehicle. The steering input device comprises a linkage assembly that is configured to swivel, a handle pivotally coupled to the linkage assembly, and a stop member. The handle is configured to move in the fore and aft direction, wherein the direction of travel of the vehicle is controlled by the fore and aft position of the handle and/or the position of the linkage assembly. The stop member is configured to limit the angular rotation in which the linkage assembly is allowed to swivel.

DETAILED DESCRIPTION

It is to be understood that both the foregoing general description and the following detailed description are exemplary and explanatory only, and are not restrictive of the invention as claimed.

Figure 1:
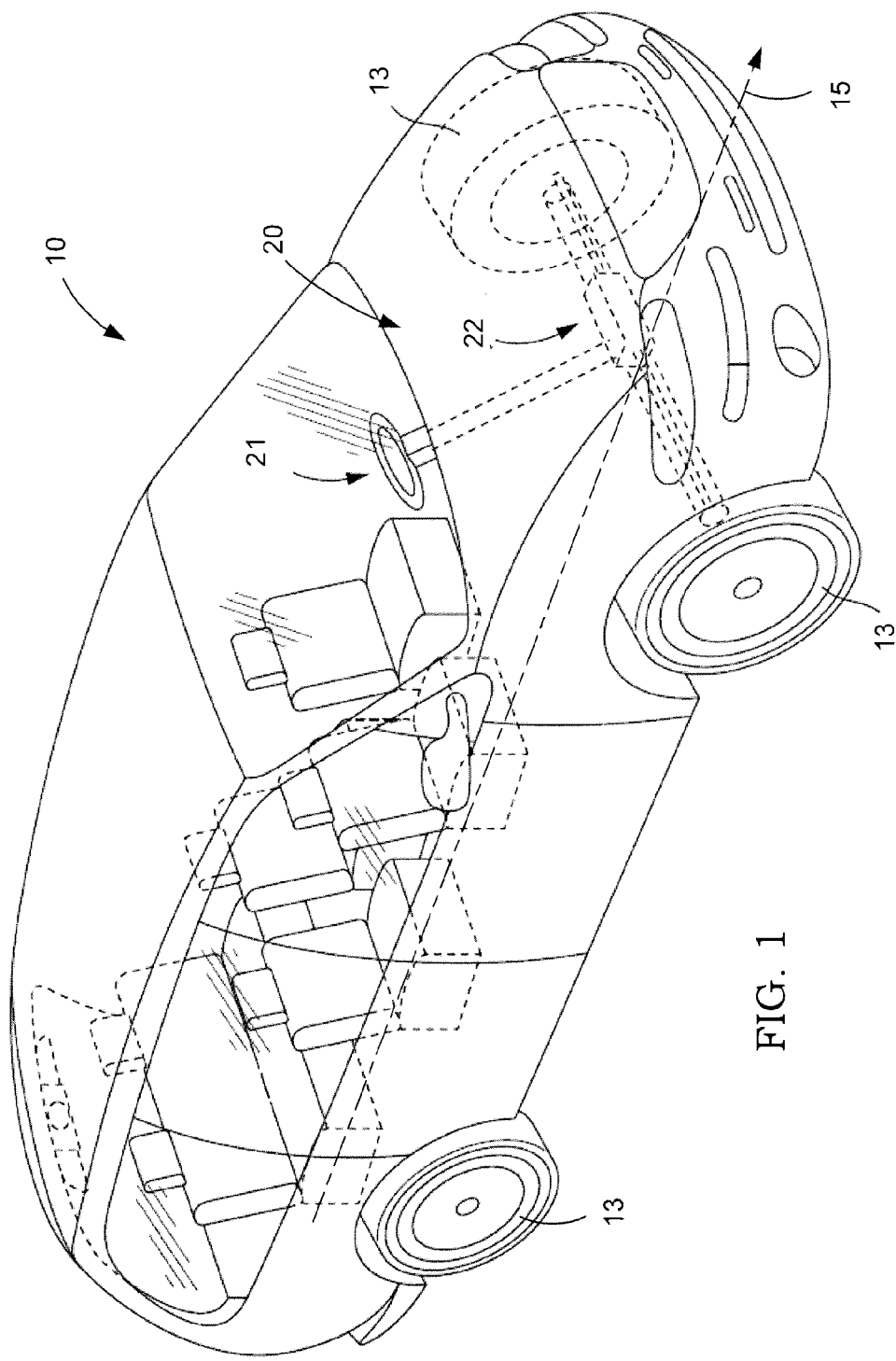
FIG. 1 is a schematic isometric view of a vehicle showing a steering system.

FIG. 1 illustrates an exemplary embodiment of a vehicle 10 that is configured to be propelled by rotating wheels 13, which may be driven by a driving device (e.g., a motor, a battery, or combination thereof). The vehicle 10 includes a steering system 20 that is configured to allow a driver or operator (not shown) to control the direction of travel (or motion) of the vehicle by changing the orientation or alignment of the wheels 13 relative to a longitudinal (or fore-aft) direction 15 of the vehicle. The typical passenger vehicle, such as vehicle 10, includes four wheels 13, wherein generally the orientation or alignment of one pair of the wheels (e.g., the front wheels or the rear wheels) is controlled by the steering system 20 to steer the vehicle. However, other vehicles may include 4-wheel steering, in which the orientation or alignment of all four wheels may be controlled by the steering system in order to steer the vehicle (e.g., for large vehicles that need the smaller turning radius of a 4-wheel system). While the steering system described herein is used with a front wheel steering system, in other embodiments, the steering system may be adapted to control the orientation or alignment of any additional wheels, either directly (e.g., mechanically) or remotely through the use of actuators or any suitable method.

As shown in FIG. 1, the steering system 20 may include an upper steering system (or steering input device) 21 and a lower steering system 22. The steering input device 21 is configured to be manipulated by the driver. The steering input device 21 provides input to the steering system based on the manipulations by the driver. The steering input device 21 may be coupled (e.g., structurally or physically, electrically) to the lower steering system 22 to communicate (or translate) the drivers input or manipulations from the upper steering system 21 to the lower steering system 22, wherein the lower steering system 22 converts the input received into movement of the wheels of the vehicle. According to one exemplary embodiment, the lower steering system 22 may be a rack and pinion system. According to another exemplary embodiment, the lower steering system 22 may be a recirculating ball system. According to still other exemplary embodiments, the steering system may be a steer-by-wire system in which sensors monitor the way in which the driver manipulates the upper steering system and the lower steering system includes actuators to manipulate the wheels. The steering system may be a manual system, or may be a power-assisted system and include hydraulic (or pneumatic) pumps or other devices to aid a driver in turning the wheels.

FIGS. 2-12 illustrate several exemplary embodiments of an upper steering system (or steering input device) for use in the steering system of a vehicle, such as the steering system 20, to control the operation (or steering) of the vehicle. According to the exemplary embodiment shown in FIGS. 2-5, the steering input device 121 includes a first handle 122 and a second handle 123 extending from opposing sides of a central portion, which may include a housing 160 and a base 125 that may be coupled to the vehicle, such as to a dashboard (i.e., instrument panel) 117 of the vehicle 110. The base 125 may be integrally formed with the housing 160 or may be separately formed from then coupled to the housing 160. The central portion may also include a central column provided within the housing 160, wherein the central column may be configured to provide structural support to the steering input device 121. For example, the central column may be configured to be coupled to a structural member supporting the dashboard of the vehicle to in turn provide support to the steering input device 121. The steering input device 121 may also include a linkage assembly (not shown) provided within the housing 160 and configured to be coupled to the handles 122, 123, wherein movement of the handles is communicated through the linkage assembly.

The first handle 122 may include a first end 126 that is configured to be coupled to a component of the steering input device 121 (e.g., linkage assembly, central portion) and a grip portion 127 that is configured to held by the driver during operation (or steering) of the vehicle. The second handle 123 may include a first end 128 that is configured to be coupled to a component of the steering input device 121 (e.g., linkage assembly, central portion) and a grip portion 129 that is configured to held by the driver during operation (or steering) of the vehicle.

Unlike a conventional steering wheel, in which the vehicle is steered by rotating the circular wheel about its center or pivot (which rotates about an axis that generally is aligned in the fore and aft direction) using a hand-over hand motion, the improved steering input device 121 allows a driver to steer the vehicle by moving (or pushing) one handle toward and moving (or pulling) the other handle away from the operator (or dashboard of the vehicle). For example, the driver may steer the vehicle by moving the first handle 122 of the steering input device 121 toward the dashboard 117 of the vehicle (and away form the driver) while simultaneously moving the second handle 123 away from the dashboard 117 of the vehicle (and toward the driver).

Although the manner of steering disclosed herein is vaguely similar to the manner used to steer vehicles having handlebars (e.g., bicycles, motorcycles, ATVs), the improved steering input devices disclosed herein do not require a driver to twist their wrists relative to a relaxed, neutral position or lean forward, away from the seat as the vehicle is turned.

According to the exemplary embodiment shown in FIGS. 6-9, the steering input device (or handle assembly) 221 includes a first handle 222 coupled to a second handle 223 through a linkage (or tie bar) assembly 240, wherein the linkage assembly 240 is configured to swivel (or rotate or pivot) about a pivot 231 of a steering (or control) column 224. The first handle 222 includes a first end 226 that is configured to be pivotally coupled to the linkage assembly 240. The second handle 223 includes a first end 228 that is configured to be pivotally coupled to the linkage assembly 240.

According to an exemplary embodiment, the linkage assembly 240 includes a first link (or bar) 241, a second link (or bar) 242, and a third link (or bar) 243. The first link 241 includes a first end 245 and a second end 246, wherein the first end 245 is configured to be pivotally coupled to the first end 226 of the first handle 222 through a pivot member 254 and the second end 246 is configured to be pivotally coupled to the first end 228 of the second handle 223 through a pivot member 254. The second link 242 includes a first end 247 and a second end 248, wherein the first end 247 is configured to be pivotally coupled to the first end 226 of the first handle 222 through a pivot member 254 and the second end 248 is configured to be pivotally coupled to the first end 228 of the second handle 223 through a pivot member 254. The third link 243 includes a first end 249 and a second end 250, wherein the first end 249 is configured to be pivotally coupled to the first end 226 of the first handle 222 through a pivot member 254 and the second end 250 is configured to be pivotally coupled to the first end 228 of the second handle 223 through a pivot member 254. The pivot member 254 may be configured to be a pin, rivet, bolt, or any suitable coupling device that allows a pivoting connection.

The first ends 245, 247 of the first and second links 241, 242 may be coupled to a first surface, such as the top surface, of the first handle 222, while the second ends 246, 248 of the first and second links 241, 242 may be coupled to a first surface, such as the top surface, of the second handle 223. The first end 249 of the third link 243 may be coupled to a second surface, such as the bottom surface, of the first handle 222, while the second end 250 of the third link 243 may be coupled to a second surface, such as the bottom surface, of the second handle 223. In other words, the first and second links 241, 242 may be configured to be coupled to the top surfaces of the first and second handles 222, 223, while the third link 243 may be configured to be coupled to the bottom surfaces of the first and second handles 222, 223. The first and second links 241, 242 may be similarly configured, having lengths, widths and thicknesses that are substantially the same. The first and second links 241, 242 may be configured parallel to each other and offset by a gap when coupled to the handles 222, 223 of the steering input device 221. In other words, the first and second links 241, 242 of the linkage assembly 240 may form a four-bar linkage when coupled to the first and second handles 222, 223, wherein the four-bar linkage may change between a substantially rectangular shape when the handles are opposed from each other (corresponding to the neutral position) and a varying parallelogram shape as the handles are moved, such as when one handle is moved forward in the vehicle and the other handle is moved rearward in the vehicle, corresponding to the a turning or steering position).

The steering input device 221 may also include a steering column (or central column or frame or base or mount) 224 that is configured to mount to the vehicle, such as the dashboard (or instrument panel) of the vehicle. The steering column may include a pivot 231, wherein the third link 243 may be configured to swivel (or pivot or rotate) about the pivot 231. Thus, the third link 243 may be pivotally coupled to the steering column 224, such that the third link 243 is provided adjacent to the steering column 224. The steering column 224 may support the third link 243, which may be provided above the steering column 224, as well as support the four-bar linkage formed by the coupled handles and links.

The steering input device 221 may also include a stop member 251, which may be configured to restrict the angular travel (or rotation) of the linkage assembly 240. The stop member 251 may be L-shaped, C-shaped, I-shaped, or configured to have any suitable shape. The stop member 251 may be configured to couple to the steering column 224. For example, the L-shaped stop member 251 may have the vertical leg coupled to the steering column 224, wherein the vertical let may be contacted by one or more link of the linkage assembly 240 upon a predetermined angle of rotation by the linkage assembly 240 about pivot 231 to thereby prevent further angular rotation of the linkage assembly 240.

Figure 10:
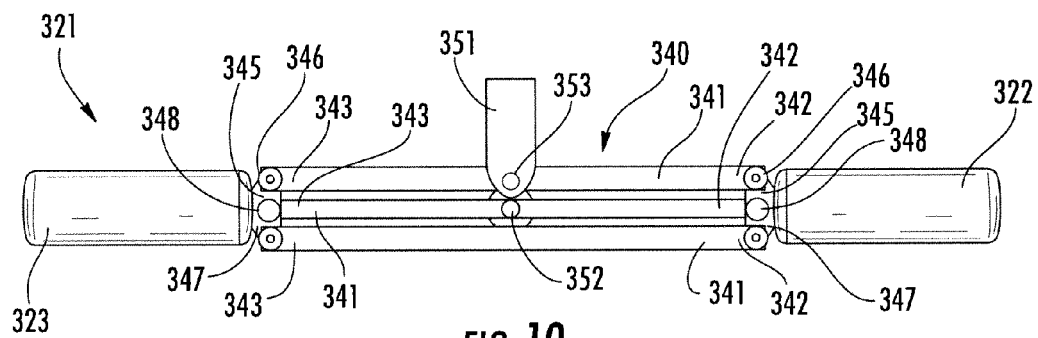
FIG. 10 is top view illustrating at least a portion of a steering input device configured in a neutral position.
Figure 11:
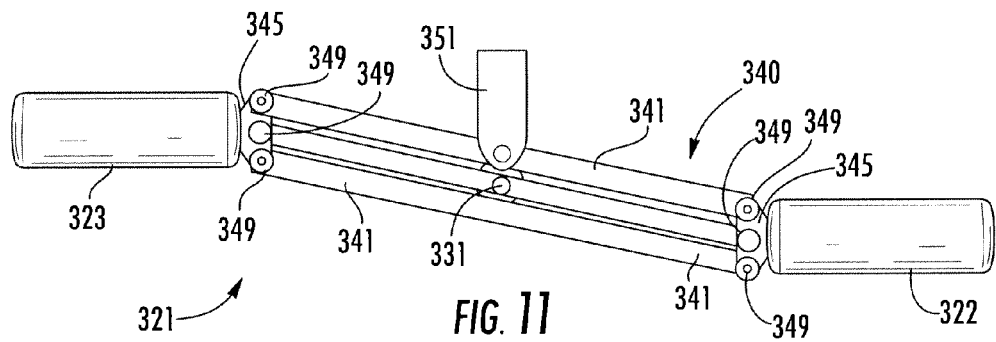
FIG. 11 is top view illustrating the steering input device of FIG. 10 configured in a right turning (or steering) position.

According to the exemplary embodiment shown in FIGS. 10 and 11, the steering input device 321 includes a first handle 322, a second handle 323, a linkage assembly 340, and a stop member 351. The first handle 322 may be coupled to the second handle 323 through the linkage assembly 340, wherein the linkage assembly 340 is configured to swivel (or pivot or rotate) about one or more pivot that may be defined by the stop member 351. For example, the stop member 351 may include a first pivot (or pivot axis) 352, which may be defined by an opening, and may include a second pivot (or pivot axis) 353, which may be defined by another opening.

The linkage assembly 340 may include one or more than one link coupled together to allow pivoting or swiveling of the linkage assembly 340. As shown in FIGS. 10 and 11, the linkage assembly 340 may include three elongated links 341 coupled to two side links 345. Each elongated link 341 may be rectangular shaped having a first end 342 and a second end 343, wherein each end may include an opening or aperture configured to receive a fastener or a coupling member. The first end 342 of each elongated link 341 is configured to be pivotally coupled to a side link 345 through a coupling member 349, while the second end 343 of each elongated link 341 is configured to be pivotally coupled to the other side link 345 through another coupling member 349. Each side link 345 may be rectangular shaped having a first end 346, a second end 347, and a center portion 348, wherein each of the first and second ends 346, 347 and the center portion 348 may be configured to include an opening or an aperture configured to receive a coupling member 349. The coupling member 349 may be configured as a rivet, bolt, screw, pin, or as any suitable fastener.

The linkage assembly 340 may be configured with two elongated links 341 pivotally coupled to the first and second ends 346, 347 of the two side links 345 to form a four-bar linkage with the two elongated links 341 parallel and offset from each other by a first gap (or distance) and with the two side links parallel and offset from each other by a second gap (or distance). Each end of the third elongated link 341 may be pivotally coupled to the center portion 348 of one of the side links 345, wherein that the third elongated link 341 is configured to be provided in the gap between (and configured to remain parallel to) the first and second elongated links 341. The third elongated link 341 may be provided on the side (e.g., bottom side) of the two side links that is opposite to the first and second elongated links 341.

The linkage assembly 340 is configured to generally have a rectangular shape when configured in the neutral position (i.e., when the handles are opposed from each other), which corresponds to the vehicle being steered generally in the longitudinal direction. The linkage assembly 340 of the steering input device 321 is also configured to allow the driver to manipulate the shape of the linkage assembly 340 by moving (e.g., forward or rearward) the first and second handles 322, 323, such as to steer the vehicle in a direction that is generally oblique or curved relative to the longitudinal direction. For example, as the driver moves one handle away from the driver and moves the other handle toward the driver, the shape of the linkage assembly 340 parallelograms from the generally rectangular shape about a pivot or pivots defined by the stop member 351.

The stop member 351 may be configured to be C-shaped, wherein the lower leg of the C-shape may be configured to support the linkage assembly 340 and may include an opening (or an aperture), which may receive a coupling member 349. The center line of the opening in the lower leg is configured to define a pivot (or pivot axis) 352 for the linkage assembly 340, such as the pivot axis 352 for the lower elongated link 341. The upper leg of the C-shaped stop member 351 may include an opening (or an aperture), which may receive a coupling member 349. The center line of the opening is configured to define a pivot (or pivot axis) 353 for the linkage assembly 340, such as a pivot axis 353 for one of the upper elongated links 341. The stop member 351 of the steering input device 221 may also be configured to be coupled to the vehicle (e.g., dashboard) or to the steering column (or central column) 224, which may mount to the vehicle, such as to the dashboard of the vehicle. The rear (or vertical) member (i.e., the member that connects the upper and lower legs) of the C-shaped stop member 351 may be configured to limit the angle of alignment or orientation that the linkage assembly 340 is allowed to parallelogram to when the handles are moved. For example, this angle of alignment or orientation may be tailored or controlled by varying the position (or offset) of the rear member relative to linkage assembly 340, such as relative to one of the elongated links 341. Also, for example, as the width of the stop member 351 increases, the angular travel (or rotation) of the linkage assembly 340 may be reduced accordingly.

Figure 6:
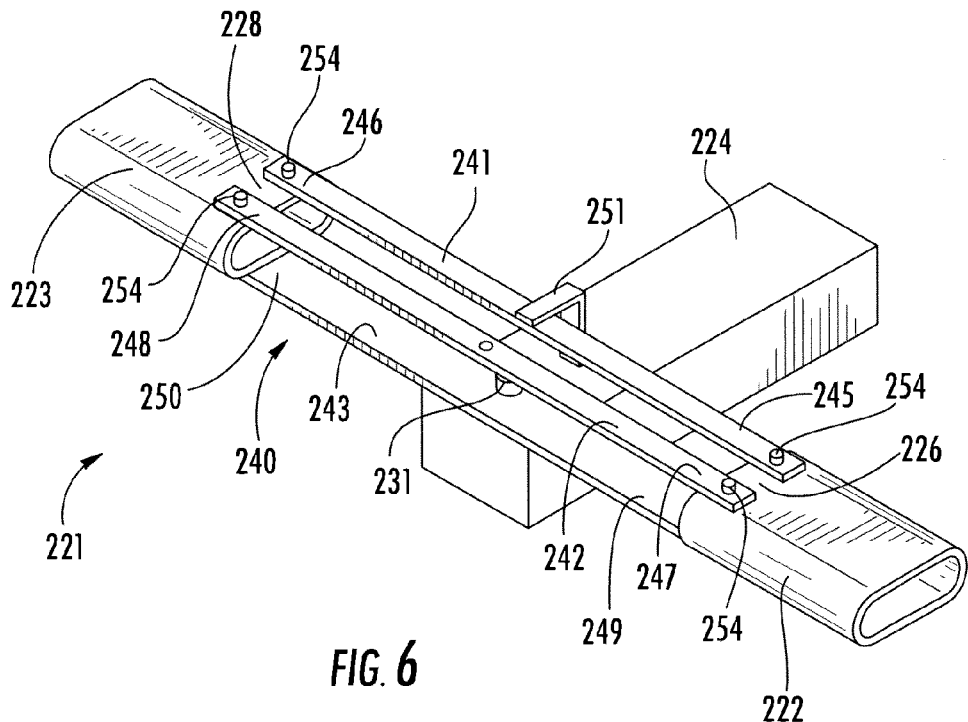
FIG. 6 is a perspective view of at least a portion of a steering input device for use in a steering system, illustrating the steering input device configured in a neutral position.

The steering input device is configured to have a neutral position, such as shown in FIGS. 6 and 10, wherein the vehicle is configured to move (or steer or travel) generally in the longitudinal direction. When the steering input device 221, 321 is configured in the neutral position the handles 222, 223, 322, 323 are at a mid-point and the linkage (or tie bar) assembly 240, 340 is generally perpendicular to the steering column 224 and/or the stop member 351 (e.g., in a sideways orientation). In other words, when the steering input device is configured in the neutral position, the handles are aligned opposing each other and substantially concentric along a cross-car axis.

Figure 7:
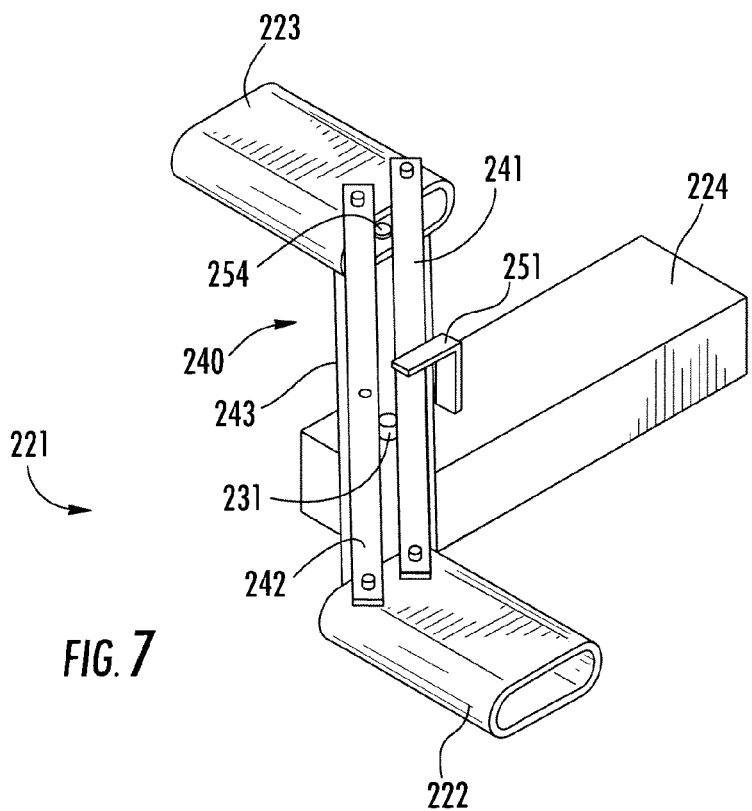
FIG. 7 is a perspective view illustrating the steering input device of FIG. 6 configured in a right turning (or steering) position.
Figure 8:
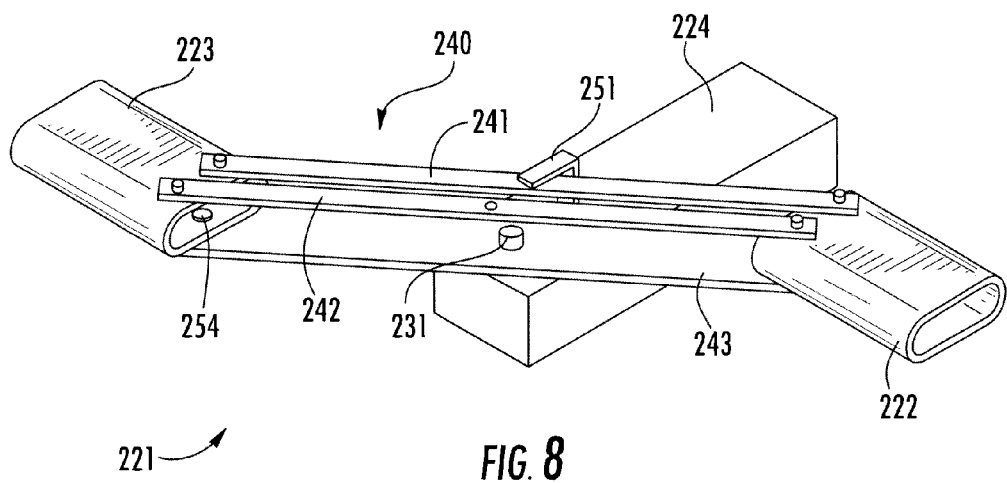
FIG. 8 is a perspective view illustrating the steering input device of FIG. 6 configured in a left turning (or steering) position.
Figure 9:
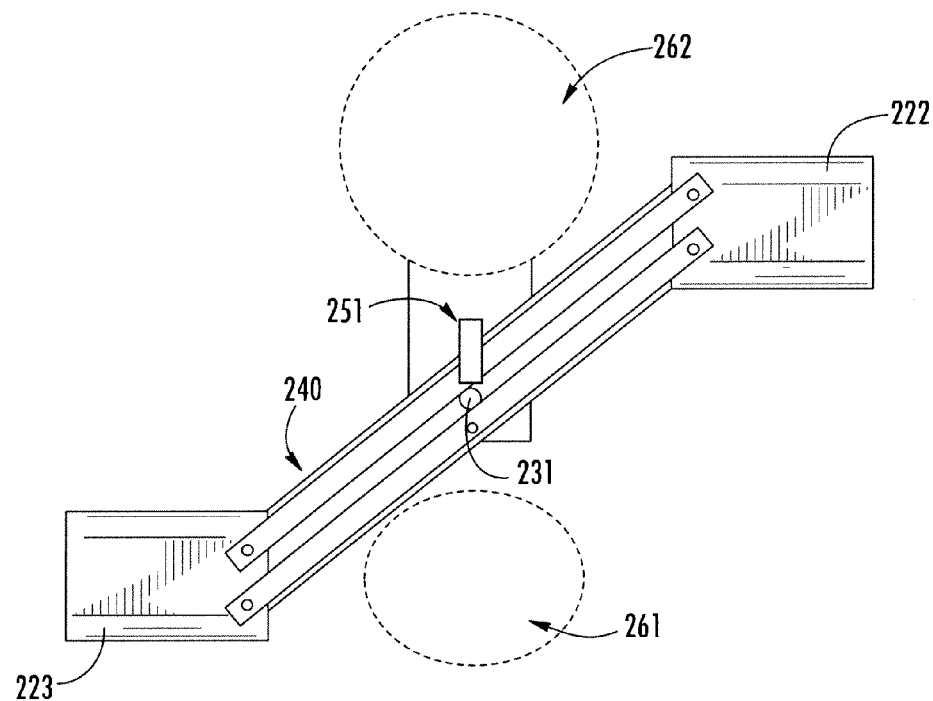
FIG. 9 is a top view illustrating the steering input device of FIG. 6 configured in a left turning (or steering) position.

The steering input device is also configured to have any number of non-neutral positions, which are configured to steer the vehicle in a direction other than the longitudinal direction. The steering input device may provide continuous adjustment of the wheels of the vehicle by having a continuous adjustment of the handles (and coupled linkage assembly) within a tailored range of operation (e.g., angular travel). Thus, the driver of the vehicle may change the direction of travel of the vehicle by manipulating or moving the handles of the steering input device from the non-neutral position. According to the exemplary embodiment shown in FIGS. 7 and 11, the driver may steer the vehicle to the right (relative to the longitudinal direction) by pulling back on (i.e., moving toward the driver) the right handle 222, 322 and pushing forward on (i.e., moving away from the driver) the left handle 223, 323. Conversely, as shown in FIGS. 8 and 9, the driver may steer the vehicle to the left (relative to the longitudinal direction) by pulling back on (i.e., moving toward the driver) the left handle 223, 323 and pushing forward on (i.e., moving away from the driver) the right handle 222, 322. The degree of angular variation from the longitudinal direction of steering provided may be determined by the degree of angular variation of the handles from the neutral position.

The links (e.g., the first and second links) 241, 242, 341 constrain the movement of the handles 222, 223, 322, 323 so that the handles remain parallel relative to each other and relative to their orientations or alignments in the neutral position. In other words, as each handle is moved (e.g., forward or rearward) from the neutral position, the handles remain substantially parallel to each other, and accordingly, each handle remains substantially parallel to the neutral position of that handle. Thus, when the driver moves the handles into a steering left or right (i.e., a non-neutral) position, the handles do not rotate and are configured to move either in the fore or aft directions about an arc length defined by the distance between the pivot and the handle relative to the driver and towards the steering column (in the cross-car direction) slightly. This action reduces the need for the driver to twist their upper body to steer a vehicle, as is needed for a conventional handlebar system.

The manipulations or motions input into the steering input device 21, 221, 321 by the driver may be communicated (or translated) to the lower steering system 22 to control the wheels 13 of the vehicle 10, 110 in order to steer the vehicle in the desired direction. The communication (or translation) between the steering input device and the lower steering system of the steering system may occur through a variety of manners. In a preferred embodiment, the steering system 20 is a steer-by-wire system, such as where the communication (e.g., of the input data) is transferred or communicated through electrical connections (e.g., wiring harnesses). In such an electronic system, a motor or other device may be included to provide force feedback to the handles and to bias the handles back to the neutral position from a steering left or right (or non-neutral) position. In other exemplary embodiments, the steering system 20 may be a mechanical system that may be configured to include one or more mechanical connections (e.g., universal joint, rack and pinion, etc) to translate or communicate the motion of the steering input device to the wheels, wherein the manipulations or motions of the driver may be communicated through the various mechanical connections within the steering system.

The steering input device may include a display system, such as for providing the driver with vehicle performance information (e.g., speed, fuel level, etc.). The steering input device may also include an interface (or control) system, such as where the driver can control other vehicle systems (e.g., HVAC, stereo controls, navigation unit, etc.) through manipulation of the interface system. The steering input device may be configured to include a plurality of display and/or interface systems, which may be tailored to customer desires or requirements. The steering input devices, as disclosed herein, allow for the display and/or the interface systems to be stationary and non-rotating relative to the driver when coupled to the steering column, since these steering input devices do not pivot like conventional steering wheels about a central axis that extends generally in the fore and aft direction.

The steering input device may include a housing configured to surround at least a portion of the steering input device (e.g., the linkage assembly) and/or to provide one or more stationary zones, which may include displays and/or interface systems. The housing may also be configured to mount or couple to the vehicle, such as to the dashboard of the vehicle. According to the exemplary embodiment shown in FIGS. 2-5, the steering input device 121 includes a housing 160 having a first stationary zone 161 positioned between the linkage assembly and the driver, a second stationary zone 162 positioned between the linkage assembly and the dashboard 117, a third stationary zone 163 positioned above the linkage assembly, and a fourth stationary zone 164 positioned below the linkage assembly. The housing 160 may be configured to provide a mounting structure for coupling of a safety device, such as an airbag assembly or module, which may be configured to deploy from the first stationary zone 161 to provide restraint to the driver, such as during a vehicle impact. The housing 160 may also include a first display system 165 located in the second stationary zone 162 to display information to the driver, such as vehicle speed, turn signal indicators, battery voltage levels, fluid levels (e.g., oil, fuel, etc.). Additional displays may also be provided on other stationary zones of the housing to provide the driver with other information or status on any vehicle function, such as warning lights (e.g., check engine warnings, low tire pressure warnings, etc.). For example, the housing 160 may include a second display system 166 located in the third stationary zone 163.

The zones (e.g., the first stationary zone, the second stationary zone, the third stationary zones) may be configured to extend inside the housing, such as within the housing 160, and are not limited to the portion external to the housing. For example, the first stationary zone 161 may be configured to house the airbag module in the stored configuration within the housing 160, wherein the first stationary zone outside of the housing may be the deployment trajectory of the airbag cushion of the airbag module. As another example, the second stationary zone 162 may include a display, such as to illustrate or indicate vehicle speed or turn signal usage, provided external to the housing 160, wherein provided internal to the housing 160 in the second stationary zone 162 may be the circuitry and systems for controlling the external displays.

As shown in FIG. 9, the steering input device 221 may include a first zone 261 and a second zone 262, which may be configured as stationary zones. For example, the first stationary zone 261 may be configured to include a safety device, such as an airbag module to provide restrain to the driver during a vehicle impact. Also, for example, the second stationary zone 262 may be configured to include one or more control or display systems, as described herein.

The static mounting location for the safety device such as an airbag assembly helps to increase the predictability with which the airbag cushion will deploy relative to the driver. In this way, the geometry of the airbag cushion can be more closely customized to better protect the driver in a collision.

Figure 2:
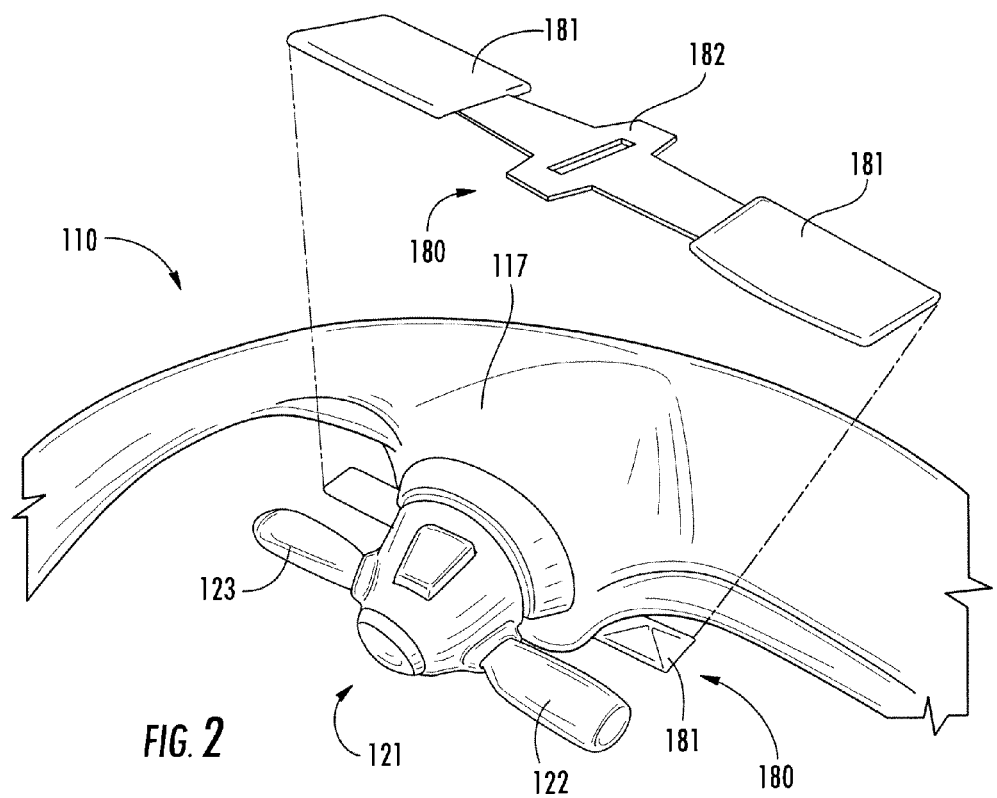
FIG. 2 is a perspective view of a steering input device for use in the steering system of a vehicle.
Figure 3:
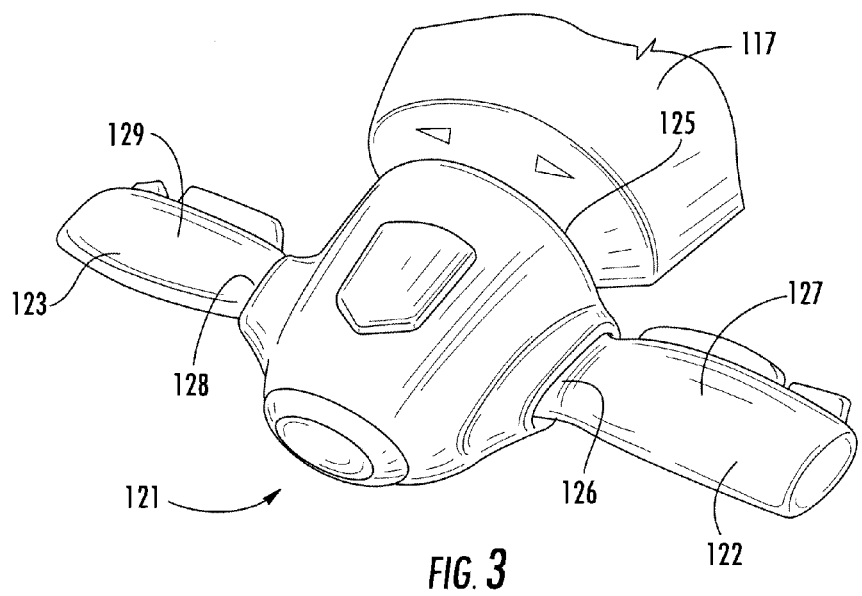
FIG. 3 is a perspective view of the steering input device of FIG. 2.

As shown in FIGS. 2 and 3, openings on either side of the housing 160 allow the handles 122, 123 (coupled to the linkage assembly provided in the housing) to protrude outward beyond the housing 160, wherein the driver may move the handles 122, 123 in the fore and aft direction to operate (or steer) the vehicle. The steering input device 121 may also include one or more covers to prevent access into the housing 160 through the openings and to the other components (e.g., airbag module, linkage assembly, internal mechanisms and/or electronic circuits, etc.) of the steering input device 121. According to an exemplary embodiment, the cover may be rigid and may be formed from one or more generally rigid panels, which may include an opening configured to receive at least a portion of the linkage assembly, such as the link. The rigid panel may be configured to slide in the fore and aft direction along a track or in a slot when the handles 122, 123 are moved by the driver to steer the vehicle. The cover may also include a series of overlapping rigid panels. According to another exemplary embodiment, the cover may be flexible and may include one or more panel comprising a generally flexible material (e.g., leather, vinyl, fabric, etc.).

The handles of the steering input device may also be configured to include other features. For example, various controls (e.g., throttle, brake, turn signal, horn, etc.) may be located on the handles so that the controls may be accessed by the driver without removing a hand from a handle.

According to an exemplary embodiment, the throttle, brake, and a clutch (if the vehicle includes a manual transmission) are controlled by the driver via foot pedals, similar to a conventional vehicle, and the controls for other features (e.g., turn signals, a horn, headlights, windshield wipers, etc.) that are typically controlled by input devices coupled to a conventional steering wheel and steering column are provided on either one or both of the handles. Alternatively, these controls may be configured to be on the stationary housing of the steering input device. For example, the vehicle horn may be activated with a button on the handles or with a button or switch that is activated by pressing such on the stationary housing.

Figure 4:
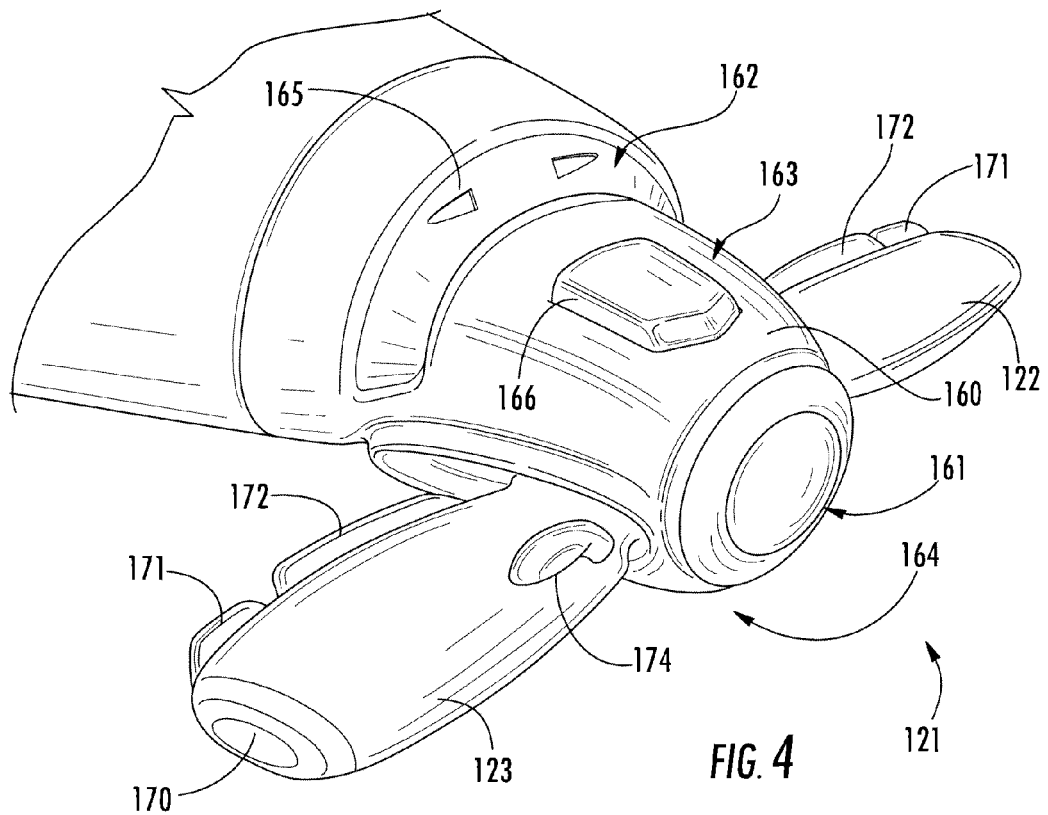
FIG. 4 is another perspective view of the steering input device of FIG. 2.
Figure 5:
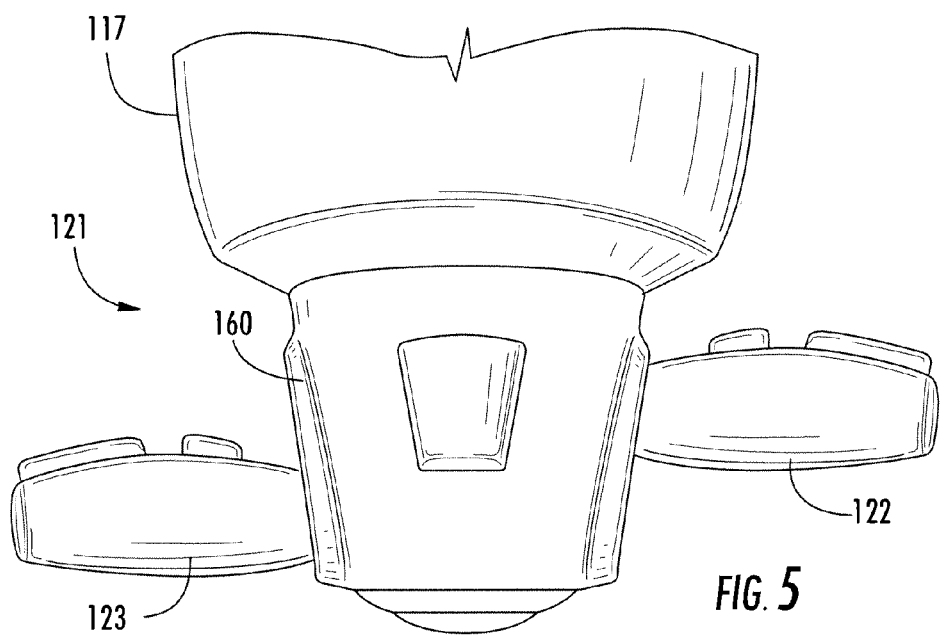
FIG. 5 is a top view of the steering input device of FIG. 2.

According to another exemplary embodiment, the throttle, and brake may be controlled with buttons or levers coupled to the handles. As shown in FIG. 4, the throttle of the vehicle may be controlled through a throttle lever 174, which may be configured to be actuated by the thumb of the driver. Such a lever 174 may be mounted on the top of the handle or below the handle. Also as shown in FIG. 4, the brake 172 may be controlled through a button or lever that may be activated by the driver squeezing the button or lever, such as by pulling the button with one or more fingers. The throttle and brake controls may be provided on both handles so that a driver may maintain a constant speed and control of the vehicle even if only one hand is on the steering input device.

The steering input device 121 having the controls (e.g., the throttle control 174, the brake control 172) provided on both handles may include a physical link and/or a device to provide electric communication. For example, the controls (e.g., the throttle control 174, the brake control 172) of the first handle 122 may be in electric communication with or physically coupled to the controls of the second handle 123. The physical link and/or electric communication device may be configured to ensure simultaneous movement (or action) of both corresponding controls when only the control on one handle is pressed (or moved or activated). Further, a safety or interrupt function may be built (or configured) into the system to prevent two or more controls, which may provide conflicting inputs, from being pressed at about the same time (such as if a driver were to press down on the gas pedal with the right foot while pressing down on the brake pedal with the left foot). For example, if the driver engaged the throttle control 174 while the brake 172 was also engaged, then the steering input device 121 may (or another vehicle component, such as the electronic control module of the vehicle, may communicate to the steering input device to) automatically release the brake control 172. In other embodiments, the steering input device (or any vehicle component) may temporarily disable the throttle control (or disregard the input from the throttle control) when a brake control is engaged.

Controls (or control systems) for any other feature (e.g., turn signals, a horn, headlights, windshield wipers, etc.) of the vehicle, such as those features that are typically controlled by input devices coupled to a conventional steering wheel and steering column may be provided either on the handles or on the stationary housing. For example, as shown in FIG. 4, the steering input device 121 may include a button 170 provided on one or both handles, such as on the outer end of the second handle 123, that is configured to activate the horn mechanism of the vehicle when the button 170 is depressed. As another example shown in FIG. 4, the steering input device 121 may include a button (or lever) 171 that is configured to activate the turn signal of the vehicle to alert other drivers of an intent to turn the vehicle. Also, the steering input device 121 may include a button 171 provided on the first handle 122 configured to activate the right turn signal of the vehicle and may also include a button 171 provided on the second handle 123 configured to activate the left turn signal of the vehicle. It should be noted that the controls disclosed herein are not meant as limitations.

According to another exemplary embodiment, the control systems may be configured to operate similar to the controls (e.g., the throttle control) on a conventional motorcycle. For example, the throttle may be controlled by twisting all of the handle or a portion of the handle. The brake may be controlled through a button or a lever that is activated (e.g., depressed, pulled, etc.) by the driver, such as by squeezing or pulling the button or lever with the hand or a portion of the hand (e.g., finger) or may be controlled by the driver through a foot pedal. Control systems for any other feature (e.g., turn signals, a horn, headlights, windshield wipers, etc.) of the vehicle may be provided either on one or both of the handles or may be provided on the stationary housing, such as the housing 160.

The placement of display and control systems on the stationary housing of the steering input device reduces the complexity of the wiring and/or circuitry needed to couple or electrically communicate such devices, as well as any other electronic component (e.g., an airbag module) provided therein, to the vehicle electrical system (e.g., the electronic control module of the vehicle). Because the steering input device (e.g., housing, steering column) may be configured to not rotate, clock spring wires are not needed and may be eliminated. This may reduce the cost of the steering input device by reducing the piece and labor costs. The fore and aft movement of the handles, as well as the movement of the steering input device itself (e.g., to move from a deployed to a stowed position or configuration), may be compensated for with the inclusion of relatively simple wiring harnesses and/or circuitry.

According to an exemplary embodiment, the linkage assembly (or tie rod assembly) has a range of motion of approximately plus and/or minus forty-five degrees (+/−45°) from the neutral position. In other words, each handle may be moved forward and rearward from the neutral position a distance that corresponds to the linkage assembly, such as a link, pivoting an angular distance of forty-five degrees in both directions (e.g., clockwise and counterclockwise) from the neutral position. Thus, each handle of the steering input device may be configured to have a total range of angular travel of ninety degrees (90°). It should be noted that the ranges of angular travel of the handles of the steering input device may be increased or reduced (relative to the 90° travel) to tailor the movement to accommodate customer desires or requirements. Such a range of motion allows a driver to control the steering of the vehicle with sufficient precision, yet does not require excessive movement of the handles that would result in the handles being pulled too close to the driver (intruding on the occupant space), pushed too far away from the driver (contacting the vehicle dashboard or causing the driver to have to lean forward), or moved too close to the steering column (causing the driver to have to twist and contort the wrists).

The full extent of wheel movement is generally only useful when the vehicle is stopped or moving at low speeds, such as for parking maneuvers. Accordingly, the steering system may be configured to include a device to provide a speed-sensitive ratio between the movement of the steering input device (e.g., the handles) and the resulting movement (or alignment or orientation) of the wheels. In other words, the steering system may be configured to change (e.g., reduce) the ratio of the amount of movement of the wheels to the corresponding amount of movement of the handles based on the speed (e.g., velocity) that the vehicle is traveling or moving. For example, at higher speeds, a full right turn movement of the handles (e.g., pushing the left handle fully forward against the stop and pulling the right handle fully back against the stop) of the input steering device may turn (or move or pivot) the wheels of the vehicle an angle (or angular travel) that is smaller than the angle when a similar movement of the handles is executed while the vehicle is stopped or moving with a slower speed.

In other embodiments, the steering input device may respond both to fore and aft movements of the handles and to side to side movements of the handles or a lateral force on the handles. Such side to side movements or forces imparted to the handles of the input steering device may be used, such as when the vehicle is stopped or moving at a lower speed, to move (or pivot) the wheels of the vehicle to an extent (i.e., an angular travel) greater than the wheels are allowed to move when the vehicle is moving at higher speeds. For example, when the vehicle is moving at higher speeds, moving the handles (and coupled linkage assembly) to the maximum right-hand turn (as shown in FIG. 7) or left-hand turn (FIG. 8) positions may correspond to an angular movement of the wheels that is a percentage (e.g., an amount less than that) of the maximum possible angular movement, such as when the vehicle is moving at lower speeds. Once the vehicle drops below a certain threshold speed or is stopped (e.g., to park the vehicle), the additional side to side functionality may be activated, allowing a user to place a sideways pressure on the handles, such as when the handles are in the maximum right-hand turn or left-hand turn positions. The steering input device of the steering system may sense the side to side pressure on the handles and communicate such to the lower steering system, wherein the steering system may be configured to continue turning the wheels past the maximum extent, which is possible at higher speeds. In this way, the wheels of the vehicle may be turned to an extreme angle (i.e., an angle relative to the longitudinal direction that is greater than the angle the wheels may turn to when the vehicle is moving at higher speeds) to improve low speed maneuvering. However, the steering system may be configured to prevent (or prohibit) the wheels from being able to be turned to such an extreme angle when the vehicle is moving at higher speeds to avoid reducing the stability of (or driver control over) the vehicle.

While the handles are shown to be parallel to the linkage assembly (or tie bar assembly) in the neutral position, such as shown in FIGS. 6 and 10, the handles may be oriented differently to improve ergonomics. For instance, in another exemplary embodiment, the handles may be swept backward slightly. In another exemplary embodiment, the handles may be tilted or curved so they are not horizontal, but instead angled downward. Whatever the orientation of the handle, the kinematics of the tie bar keeps the orientation constant throughout the range of motion of the steering system, preventing the driver from having to bend awkwardly at the wrists or lean forward, away from the seat to make a turning motion.

Figure 12:
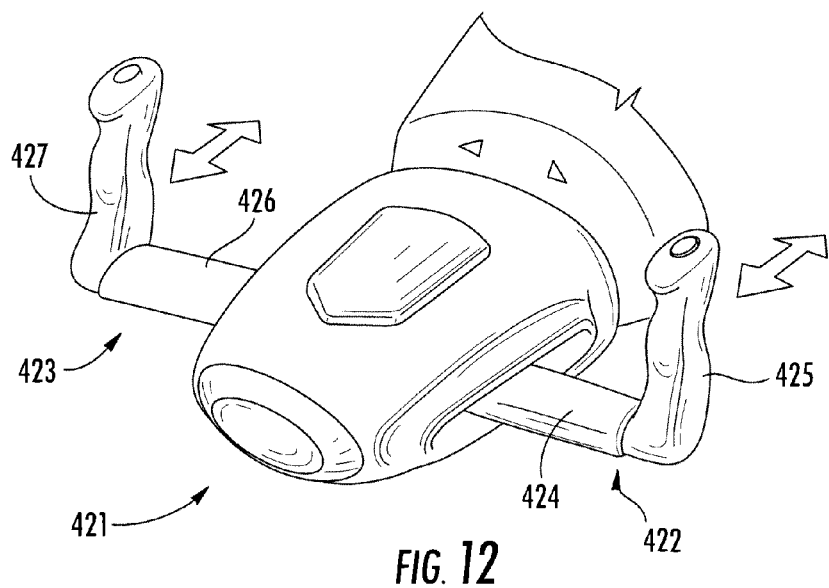
FIG. 12 is a perspective view of a steering input device that is configured to include vertically aligned handles.

The handles of the steering input device may be configured to extend generally in the horizontal direction, as shown in the embodiments of FIGS. 2-11. Alternatively, the steering input device 421 may include handles 422, 423 configured to have at least a portion extend generally in the vertical direction, as shown in FIG. 12, to extend at any oblique angle, or to extend in any suitable manner or direction. Such a handle having a vertically configured portion or member may resemble a joystick device, with one end of the handle coupled to the linkage assembly. According to the exemplary embodiment shown in FIG. 12, the handles 422, 423 of the steering input device 421 may include a horizontal member 424, 426 and a vertical member 425, 427. The horizontal member 424, 426 may be configured to couple the vertical member 425, 427 to the linkage assembly of the steering input device 421. Similar to the horizontal handles described herein, the vertical handles 422, 423 may include grips, buttons, levers, or any other control systems configured to activate or control various vehicle functions (e.g., the throttle, brake, clutch, turn signals, headlights, etc.), which may be provided on the horizontal member, vertical member, or a combination thereof. The handles that include vertical members may be preferred by some operators or drivers, since the free end (i.e., the end opposite to the end that is coupled to the horizontal member) of each handle is easily accessible by a thumb of the driver, which may make controlling a vehicle function through a control located on the free end of the handle more convenient. Also, the handles having vertical members may be more ergonomic to operate, since the wrists of the driver (or operator) may be configured more vertical, as opposed to horizontal.

The steering input system having handles configured to include vertically aligned portions, such as the steering input system shown in FIG. 12, may include a linkage assembly that is coupled to the handles. The steering input system 421 may be configured to include the linkage assembly 340, the linkage assembly 240, or a different configured linkage assembly. Similarly, the steering input system having handles configured aligned horizontally, such as the steering input system 121 shown in FIG. 3, may include the linkage assembly 340, the linkage assembly 240, or a different configured linkage assembly.

The steering input device may be configured to be adjustable (or moveable) relative to the vehicle, such as the dashboard of the vehicle. Such movements may be configured to adjust the position of the steering input device, such as the handles to improve comfort and ergonomics. For example, the position of the handles may be configured to be adjustable to accommodate varying sized drivers (e.g., fifth percentile, ninety-fifth percentile). As another example, the position of the steering input device may be adjustable to convert the steering input device from a deployed or use configuration to a storage or docked configuration in which the steering input device is moved closer to or within the vehicle dashboard. Such a storage configuration may be especially desirable in smaller vehicles, such as city cars and microcars, which generally have reduced interior room, making egress from and ingress into the vehicle relatively difficult. The steering input device may also be configured to move automatically (i.e., controlled by the vehicle or remotely, such as by push button, by an operator or driver of the vehicle) between two (or more) configurations. For example, the steering input device may be configured to extend (or lower, or extract, etc.) into the deployed position when the vehicle is turned on and may be configured to retract (or raise) back to the storage position when the vehicle is turned off (or in a parked mode of operation). Additionally, the steering input device may be configured to collapse, such as during a frontal collision or impact with an obstacle, in the same (or different) direction as the adjustment direction. For example, the steering input device may be configured to collapse or withdraw toward the dashboard (i.e., moving toward the front of the vehicle and away from the driver) during a frontal impact of the vehicle to reduce the chance of impact between the driver and the steering input device.

The steering input device 121 may additionally include an arm rest (or arm pad or arm support) 180. The arm rest may be configured to reduce the fatigue of the driver by allowing the driver to relax the arms so that the wrists or forearms are at least partially supported by the arm rest. According to one exemplary embodiment, shown in FIG. 2, the arm rest 180 includes one or more platforms 181 configured to support the arms of the driver and a center portion 182 configured to couple to the steering input device, such as the housing. The platforms 181 may be contoured to provide improved comfort. The arm rest 180 may be positioned below the steering input device. The arm rest 180 may be configured to move, such as in the fore-aft direction, to adjust the location of support by the platforms 181. The arm rest 180 may also be configured to be manipulated from a use position (i.e., where the arms of the driver may be supported) to a stowed position, which may be out of the range of motion of the handles of the steering input device. For example, the platforms 181 of the arm rest 180 may be configured to slide or move toward the center portion 182 to a stowed position under the housing of the steering input device or under the dashboard. As another example, the platforms may be configured to pivot to a stowed position. When needed, the arm rest 180 (or the platforms 181 of the arm rest) can be moved toward the driver until they are generally below the handles 122, 123. The arm rest may be generally static and remain in a position corresponding with the neutral position of the handle assembly or may be moveable and move freely with the driver's wrists as the handle assembly is moved. The arm rest may be manually deployed by the driver or may be automatically deployed, such as by using a motor that is activated by a button or activated by a sensor input (e.g., a relaxing of the driver's hands on the handles, a threshold speed, a threshold duration of travel at a preset speed, a voice command, etc.).

In other embodiments, the handles may include integrated arm wrests. In one exemplary embodiment, the steering input device may include a platform or other suitable body configured to extend from each handle, wherein each platform provides a hand rest for the driver. In another exemplary embodiment, the steering input device may include two or more handles provided on either side of the linkage assembly. For example, the steering input device may include a vertically extending set of handles and a horizontally extending set of handles to allow the driver to choose based on comfort or preference which set to control the vehicle with. Also for example, the steering input device may include a first set of handles configured closer to the driver and a second set of handles configured farther from the driver; wherein the driver may use the closer pair of handles or may use the more remote pair of handles and use the closer pair as arm rests.

Although the embodiments disclosed herein include more than one handle, the steering input device may be configured to include one handle that is pivotally coupled to a linkage assembly, which may be configured to swivel (or pivot or rotate) about a pivot. For example, such a steering input device may be configured to include about one-half of the device illustrated in FIGS. 10 and 11, wherein the steering input device includes a handle 322 pivotally coupled to a linkage assembly that comprises only the side that is coupled to the handle 322, which may be configured to pivot about the first pivot 352 and the second pivot 353.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the steering systems as shown in the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. A steering system for allowing an operator to control the direction of travel of a vehicle propelled on wheels, comprising:
   a steering input device configured to include a first handle and a second handle pivotally coupled on opposing ends of a linkage assembly that is configured to swivel,
   wherein the handles are configured to move in the fore and aft direction, wherein the steering input device generates input data based on the position of the linkage assembly and/or at least one handle, the linkage assembly including:
      a first link including a first end pivotally coupled to the first handle and a second end pivotally coupled to the second handle;
      a second link including a first end pivotally coupled to the first handle and a second end pivotally coupled to the second handle; and
   a communication device to communicate the input data received by the steering input device to a lower steering system;
   wherein the lower steering system is configured to receive the input data from the steering input device and control the direction of the wheels based on the input data received.

2. The steering system of claim 1, wherein the first and second links of the linkage assembly are configured as a four-bar linkage.

3. The steering system of claim 2, wherein when the first handle is moved forward the second handle is configured to be moved rearward by the linkage assembly, and when the first handle is moved rearward the second handle is configured to be moved forward by the linkage assembly.

4. The steering system of claim 1, wherein the steering input device further includes a stop member that is configured to limit the angular rotation in which the linkage assembly is allowed to swivel about the pivot.

5. The steering system of claim 1, wherein the steering input device further includes a center column that is configured to support the linkage assembly and is configured to couple the steering input device to the vehicle.

6. The steering system of claim 1, wherein the steering input device further includes a throttle control system configured on at least one handle to control the throttle of the vehicle.

7. The steering system of claim 6, wherein the steering input device further includes a brake control system configured on at least one handle to control the braking of the vehicle.

8. The steering system of claim 1, wherein the steering input device further includes a display system for providing information to the operator of the vehicle.

9. The steering system of claim 1, wherein the steering input device further includes an airbag module having an inflatable airbag cushion that is configured to restrain the operator of the vehicle when inflated.

10. A steering input device for allowing an operator of a vehicle to control the vehicle, comprising:
    a linkage assembly that is configured to swivel, the linkage assembly including a first link and a second link;
    a first handle pivotally coupled to the linkage assembly, wherein the first handle is configured to move in the fore and aft direction, wherein the direction of travel of the vehicle is controlled by the fore and aft position of the first handle and/or the position of the linkage assembly;
    a second handle that is pivotally coupled to the linkage assembly on the end of the linkage assembly opposite to the first handle; and
    a stop member that is configured to limit the angular rotation in which the linkage assembly is allowed to swivel;
    wherein the first link includes a first end pivotally coupled to the first handle and a second end pivotally coupled to the second handle, and the second link includes a first end pivotally coupled to the first handle and a second end pivotally coupled to the second handle;
    wherein when the first handle is moved forward the second handle is configured to be moved rearward by the linkage assembly, and when the first handle is moved rearward the second handle is configured to be moved forward by the linkage assembly.

11. The steering input device of claim 10, further comprising a center column that is configured to support the linkage assembly and is configured to couple the steering input device to the vehicle.

12. The steering input device of claim 11, further comprising a an arm rest support positioned under the center column.

13. The steering input device of claim 12, wherein the arm rest support is movable between a use position and a stowed position.

14. The steering input device of claim 10, further comprising a display system for providing information to the operator of the vehicle.

15. The steering input device of claim 10, further comprising an airbag module having an inflatable airbag cushion that is configured to restrain the operator of the vehicle when inflated.

16. The steering input device of claim 15, further comprising a housing that is configured to enclose at least a portion of the airbag module and the linkage assembly.

17. The steering input device of claim 10, wherein at least one of the first and second handles is configured to extend substantially in a horizontal direction away from the linkage assembly.

18. The steering input device of claim 10, wherein at least one of the first and second handles includes a first portion that extends from the linkage assembly substantially in a horizontal direction and a second portion that extends from the first portion of the handle substantially in a vertical direction.

* * * * *